May 28, 1963 C. B. ESTES 3,091,167
VISUAL SIGNAL FOR PHOTOGRAPHIC CAMERAS
Original Filed Sept. 10, 1959 2 Sheets-Sheet 1

CameronB. Estes
INVENTOR.

BY R. Frank Smith
Robert W. Hampton
ATTORNEYS

May 28, 1963 C. B. ESTES 3,091,167
VISUAL SIGNAL FOR PHOTOGRAPHIC CAMERAS
Original Filed Sept. 10, 1959 2 Sheets-Sheet 2
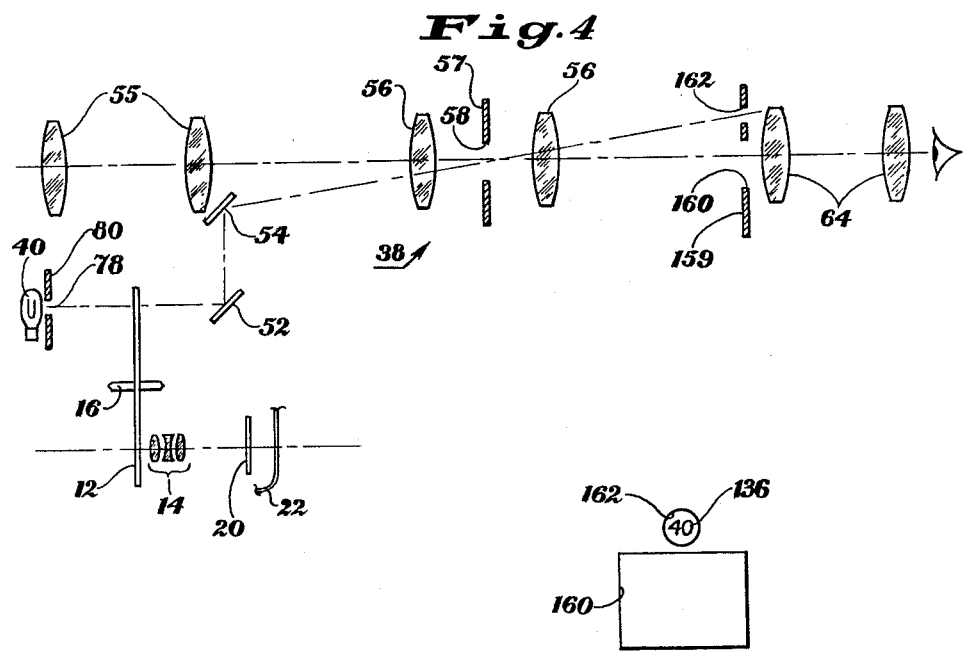
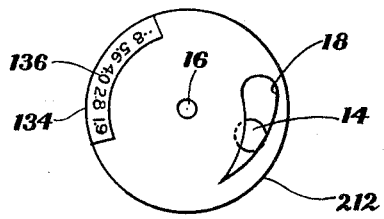
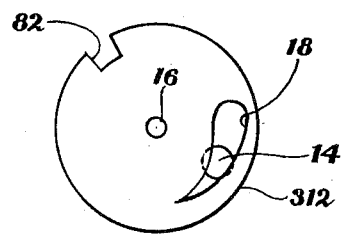
Cameron B. Estes
INVENTOR.
BY R. Frank Smith
Robert W. Hampton
ATTORNEYS United States Patent Office 3,091,167
Patented May 28, 1963

3,091,167
VISUAL SIGNAL FOR PHOTOGRAPHIC CAMERAS
Cameron B. Estes, Rochester, N.Y., assignor to Eastman Kodak Company, Rochester, N.Y., a corporation of New Jersey
Original application Sept. 10, 1959, Ser. No. 839,104. Divided and this application June 20, 1962, Ser. No. 203,820
3 Claims. (Cl. 95—64)

The present application is a divisional application of my copending parent application Serial No. 839,104, filed September 10, 1959.

The present invention relates to photographic cameras having automatic exposure control systems, and more particularly relates to means for indicating low scene brightness in such cameras.

It is convenient for the operator of a motion picture camera, which has an automatic exposure control system, to be warned when scene brightness drops below the range for which the camera is designed. Numerous devices have been proposed for presenting a low-light signal to the camera operator in such cases. However, signals of this type generally have been illuminated by scene light, the intensity of which has diminished when the signal must be effective.

It is therefore a primary object of the present invention to warn the operator of a camera, which has an automatic exposure control system, when the scene brightness is less than a predetermined value, by means of a visual signal that does not depend on scene light for illumination.

A further object of the invention is to display any of the foregoing signals in the viewfinder of a camera.

Another object of the invention is to present an artificially illuminated image of an aperture scale in the viewfinder of a camera having an automatic exposure control system and having means controlled by such system for moving the imaged scale or its pointer to correspond to scene brightness.

Other objects of the invention will appear from the following description, reference being made to the accompanying drawings, wherein:

FIG. 4 is a further embodiment of structure for presenting an image of an aperture scale in the viewfinder;

FIG. 5 is a front view of the diaphragm vane illustrated in FIG. 4;

FIG. 6 is the apparent view seen by the operator of a camera provided with the indicating structure shown in FIGS. 4 and 5; and FIG. 7 is a front view of a further form of diaphragm-vane indicating mechanism which may be employed as a part of the invention.

Figure 1:
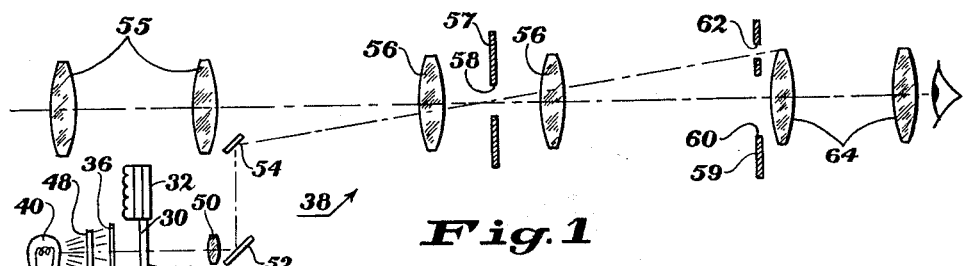
FIG. 1 is a schematic right side view of the basic elements of a motion picture camera embodying one form of the present invention.
Figure 2:
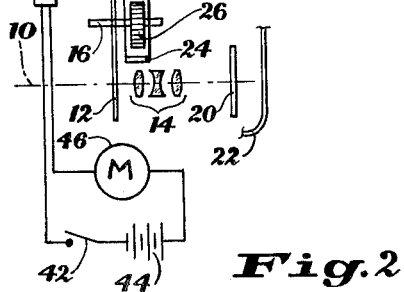
FIG. 2 is a front view of the diaphragm vane illustrated in FIG. 1.

Referring to FIG. 1, a typical camera embodying the invention has a taking-lens axis 10 on which are arranged a taking-lens system indicated generally at 14, a diaphragm vane 12, a shutter 20 and a photosensitive surface such as a filmstrip 22. Referring also to FIG. 2 the diaphragm vane may be formed as a disk pivoted centrally on a shaft 16 and having a tapered, curved aperture 18, which moves in a path crossing the lens axis 10 for establishing an exposure aperture whose area is a function of the angular position of the diaphragm vane. The diaphragm vane may be positioned automatically, in a manner well known in the art, by means of a galvanometer coil 24, which is connected to and rotates the diaphragm shaft 16. Coil 24 cooperates with a permanent magnet core 26 and is connected by leads 28 and 30 to a photocell 32, which is exposed to scene light. Variations in scene brightness cause the coil 24 to be variably energized by photocell 32 and thereby cause the coil to move angularly about shaft 16 for establishing an angular position of the diaphragm vane 12 corresponding to scene brightness. The structure and operation of the galvanometer and photocell are well known in the art and may be of the type disclosed in U.S. Patent 2,509,893, granted May 30, 1950, to C. F. Taylor et al.

Although the drawings illustrate a motion picture camera wherein the exposure is automatically controlled by positioning a diaphragm vane, it will be understood that the invention has equal utility in conjunction with other forms of automatic exposure control, e.g., in still or motion picture cameras wherein shutter speed is automatically controlled instead of or in addition to diaphragm opening.

Referring to FIG. 2, a transparent segment 34 set into the periphery of the vane 12 has signal control means in the form of an aperture scale 36, an image of which is transmitted into the viewfinder 38 (FIG. 1) of the camera in accordance with one form of the invention. The image of the aperture scale is artificially illuminated by an electric lamp 40 which is connected in circuit with a camera operating switch 42, a source of electrical potential, which is illustrated as a battery 44, and an electrically operated motor 46. This motor may be used for driving the film advance mechanism and the shutter mechanism in a manner well known in the art. When the camera operating switch 42 is closed, the drive motor 46 and lamp 40 are energized.

Figure 3:
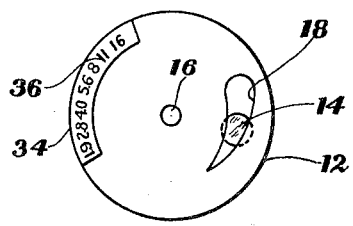
FIG. 3 is the apparent view seen by the camera operator looking through the viewfinder of a camera provided with the invention in the form shown in FIGS. 1 and 2.

Light from lamp 40 passes through a diffuser 48, the aperture scale 36 and a relay lens 50. This light is reflected by a pair of mirrors 52 and 54 to a viewing locus, which is illustrated as a telescopic viewfinder 38 having an objective 55, a centrally disposed pair of erector lenses 56 separated by a diaphragm 57 having an aperture 58, a field stop 59 having a framing aperture 60 and a scale aperture 62, and an eyepiece 64. The scale image reflected from mirror 54 is transmitted through the erector lenses 56 and the aperture 58 of diaphragm 57 and rearwardly through the scale aperture 62 of the field stop 59 into the eyepiece 64. The scale image and field frame appear through the viewfinder as illustrated in FIG. 3.

FIG. 4 illustrates an alternate embodiment of the structure shown in FIG. 1. In this embodiment, light from lamp 40 passes through a pinhole aperture 78 in a baffle plate 80, and passes through an aperture scale 136 (FIG. 5) in a transparent arcuate segment 134 on the periphery of the diaphragm vane 212. The image of scale 136 is inverted because of the pinhole aperture and is reflected into the viewfinder by mirrors 52 and 54 in the same manner as described in relation to FIG. 1. In FIG. 4, the field stop 159 forward of the eyepiece 64 is provided with a rectangular field aperture 160 (see also FIG. 6) and with a small circular scale aperture 162, which displays only a single aperture value from the image of scale 136.

A further form of signal control means is shown in FIG. 7, wherein the diaphragm vane 212 is provided with a peripheral notch 82, which may be used to cooperate with the lamp such as 40 in FIGS. 1 and 4. In this embodiment, there is no aperture scale on the diaphragm vane; instead, notch 82 merely permits light from the lamp to be transmitted into the viewfinder when a low-light condition exists and blocks such light at all other times. Obviously, the diaphragm vane may be provided with an ear rather than a notch, so that light will be excluded from the view finder only when the low-light condition exists.

This invention has been described in detail with particular reference to preferred embodiments thereof, but it will be understood that variations and modifications can be effected within the spirit and scope of the invention as described hereinabove and as defined in the appended claims.

I claim:

1. In a camera having an automatic exposure control system including a photocell and a member moved automatically under control of said photocell as a function of scene brightness to regulate the exposure of film in said camera, the combination comprising: means including an electric lamp and a source of electrical potential for said lamp for transmitting light to a viewing locus visible from outside of the camera; signal control means comprising a scale device disposed in cooperative relation with said transmitting means and moved by said member for modifying the light transmitted to said locus in accordance with the position of said member, said scale device having areas of contrasting light transmission defining scale indicia and having a path of movement intersecting the light transmitted to said locus; and a baffle having a pinhole aperture interposed between said lamp and the path of said scale device.

2. In a camera having an automatic exposure control system including a photocell and a member moved automatically under control of said photocell as a function of scene brightness to regulate the exposure of film in said camera, the combination comprising: means including an electric lamp and a source of electrical potential for said lamp for transmitting light to a viewing locus visible from the outside of the camera; and signal control means disposed in cooperative relation with said transmitting means and moved by said member for modifying the light transmitted to said locus in accordance with the position of said member, and said signal control means comprising a discontinuity in the periphery of said moving member, said discontinuity having a path intersecting the light transmitted to said locus.

3. In a camera having an automatic exposure control system including a photocell and a diaphragm vane moved automatically under control of said photocell as a function of scene brightness to regulate the exposure of film in said camera, the combination comprising: means including an electric lamp and a source of electrical potential for said lamp for transmitting light to a viewing locus visible from the outside of the camera; and signal control means comprising a notch in the periphery of said vane disposed in cooperative relation with said transmitting means and moved by said member in timed relation therewith through a path of movement intersecting the light transmitted to said locus for modifying the light transmitted to said locus in accordance with the position of said member.

References Cited in the file of this patent

UNITED STATES PATENTS 2,297,262     Tonnies _____ Sept. 29, 1942